United States Patent
Mitsuno et al.

(10) Patent No.: US 6,667,375 B1
(45) Date of Patent: Dec. 23, 2003

(54) ETHYLENE-α-OLEFIN COPOLYMER AND POLYETHYLENE COMPOSITION

(75) Inventors: Tadahiro Mitsuno, Ichihara (JP); Seiichiro Ima, Sodegaura (JP); Hiroyuki Shiraishi, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/649,619

(22) Filed: Aug. 29, 2000

(30) Foreign Application Priority Data

Aug. 31, 1999 (JP) .......... 11-245626
Sep. 6, 1999 (JP) .......... 11-251557

(51) Int. Cl.$^7$ .......... C08F 4/42
(52) U.S. Cl. .......... 526/90; 526/234; 526/236; 526/348.2; 526/348.5; 526/348.6
(58) Field of Search .......... 526/348.2, 348.5, 526/348.6, 90, 234, 236

(56) References Cited

U.S. PATENT DOCUMENTS

| | | | |
|---|---|---|---|
| 4,105,842 A | | 8/1978 | Nicco et al. |
| 4,302,566 A | | 11/1981 | Karol et al. |
| 4,349,648 A | * | 9/1982 | Jorgensen et al. .......... 526/125 |
| 4,413,097 A | | 11/1983 | Matsuura et al. |
| 4,495,334 A | | 1/1985 | Matsuura et al. |
| 5,605,969 A | | 2/1997 | Tsutsui et al. |
| 5,852,152 A | * | 12/1998 | Walton et al. .......... 526/348.1 |
| 6,117,553 A | * | 9/2000 | Hayashida et al. .......... 428/412 |

FOREIGN PATENT DOCUMENTS

| | | |
|---|---|---|
| EP | 397122 A2 | 11/1990 |
| EP | 0499093 A2 | 8/1992 |
| EP | 0703269 A1 | 3/1994 |
| EP | 0640627 A1 | 3/1995 |
| EP | 0735059 A2 | 10/1996 |
| EP | 0768322 A1 | 4/1997 |
| EP | 0783007 A2 | 7/1997 |
| EP | 0 942 007 A2 | 9/1999 |
| JP | 52125590 | 10/1977 |
| JP | 53125452 | 1/1978 |
| JP | 54154488 | 12/1979 |
| JP | 56152853 | 11/1981 |
| JP | 6210150 | 1/1987 |
| JP | 5155938 | 6/1993 |
| JP | 11181173 | 7/1999 |
| JP | 11-322833 | 11/1999 |

* cited by examiner

Primary Examiner—David W. Wu
Assistant Examiner—William Cheung
(74) Attorney, Agent, or Firm—Birch, Stewart, Kolasch & Birch, LLP

(57) ABSTRACT

An ethylene-α-olefin copolymer obtained by a gas phase polymerization method in the presence of a catalyst, wherein the copolymer satisfies the following conditions (A-1) to (A-4):

(A-1) Melt flow rate (MFR): 0.3 to 5.0 g/10 minutes
(A-2) Melt flow rate ratio (MFRR): 20 or more
(A-3) Density (d): 0.910 to 0.930 g/cm$^3$
(A-4) Coldxylene-soluble portion (CXS)(wt %) is in the range defined by the formula (1):

$$1.5 \times 10^{-4} \times d^{-125} \times MFR^{0.5} + 0.3 \geq CXS \quad \text{formula (1).}$$

4 Claims, No Drawings

ETHYLENE-α-OLEFIN COPOLYMER AND POLYETHYLENE COMPOSITION

FIELD OF THE INVENTION

The present invention relates to an ethylene-α-olefin copolymer obtained by a gas phase polymerization method in the presence a catalyst, a polyethylene composition comprising said copolymer, and a film made of said copolymer or composition. More particularly, the present invention relates to an ethylene-α-olefin copolymer which contains a small amount of a cold xylene-soluble portion (CXS component) and does not easily cause problems such as blocking and the like when made into a film or sheet, a polyethylene composition which is excellent in appearances such as gloss, transparency and the like when made into a film and is excellent in handling properties such as blocking-resistance, slipping property and the like, and a film composed of said copolymer or said composition.

BACKGROUND OF THE INVENTION

Properties required for films used as wrapping materials include excellent film-forming processability in processing a film, excellent appearances such as the gloss, transparency and the like concerning clear visibility of contents, easy handling in bag manufacturing, and excellent blocking-resistance, slipping property and the like of a film concerning easiness in opening a bag in filling, particularly, in automatic filling, and the like.

As the ethylene-based resin used for such films, ethylene-α-olefin copolymers are listed.

An ethylene-α-olefin copolymer obtained according to a high-pressure ion polymerization method in the presence of a catalyst had problems such as fuming in molding working, inclusion of a volatile component which is a cause for generation of a gas, and the like, due to problematical process (Japanese Patent Application Laid-Open (JP-A) No. 52-125590).

On the other hand, a copolymer produced by a gas phase polymerization method has a merit that the content of a volatile component causing gas generation and fuming in molding working is low, as the polymerization can be performed substantially in the absence of a solvent.

The ethylene-α-olefin copolymer obtained by a gas phase polymerization method also had problems that the copolymer contains a large amount of a cold xylene-soluble portion (CXS component) causing blocking and the like (JP-A No. 54-154488), or the copolymer has a little hexane extracted portion, however, the content of a cold xylene-soluble portion (CXS component) becomes high (JP-A No. 5-155938).

JP-A No. 56-152853 discloses a resin composition comprising an ethylene-α-olefin copolymer obtained by a gas phase polymerization method in the presence a catalyst and a low density polyethylene produced by a high pressure radical polymerization method, and a film thereof. However, a film obtained from said composition has not been satisfactory in transparency and gloss, though the impact strength thereof has been improved. Further, JP-A No. 56-152853 does not disclose the addition of an anti-blocking agent and slipping agent, therefore anti-blocking property and slipping property have not been satisfactory.

Therefore, there has been desired for an ethylene-α-olefin copolymer or resin composition which has lower content of a volatile component, causes no problems such as gas generation, fuming and the like in molding working, has a small amount of a cold xylene-soluble portion (CXS component), does not easily cause problems such as blocking and the like when made into a film or sheet, and has good balance between appearances of a film such as gloss, transparency and the like and handling properties thereof such as anti-blocking property, slipping property and the like.

OBJECT OF THE INVENTION

The present inventors have intensively studied a copolymer and a composition containing the composition which have no problems as described above, and resultantly found that a specific ethylene-α-olefin copolymer obtained by a gas phase polymerization method has a small amount of a cold xylene-soluble portion (CXS component) and does not easily cause problems such as blocking and the like when made into a film or sheet. Further, the present inventors have found that a resin composition comprising said and a specific low density polyethylene obtained by a high pressure radical polymerization method, when made into a film, has a small content of a volatile component, provides no problems such as fuming, gas generation and the like in molding, has excellent appearances such as gloss, transparency and the like, and has excellent handling properties such as anti-blocking property, slipping property and the like, and have completed the present invention.

SUMMARY OF THE INVENTION

Namely, the present invention relates to a polyethylene composition comprising 60 to 95 wt % of an ethylene-α-olefin copolymer component (A) obtained by a gas phase polymerization method in the presence of a catalyst and 5 to 40 wt % of a low density polyethylene component (B) obtained by a high pressure radical polymerization method (wherein, the total amount of component (A) and component (B) is 100 wt %), wherein said ethylene-α-olefin copolymer component (A) satisfies the following conditions (A-1) to (A-4):

(A-1) Melt flow rate (MFR): 0.3 to 5.0 g/10 minutes
(A-2) Melt flow rate ratio (MFRR): 20 or more
(A-3) Density (d): 0.910 to 0.930 g/cm$^3$
(A-4) Cold xylene-soluble portion (CXS) (wt %) is in the range defined by the formula (1):

$$1.5 \times 10^{-4} \times d^{-125} \times MFR^{0.5} + 0.3 \geq CXS \qquad \text{formula (1).}$$

DETAILED DESCRIPTION OF THE INVENTION

The present invention will be illustrated in detail below.

The gas phase polymerization method of the present invention is not particularly restricted providing it is a method in which no solvent substantially exist, and polymerization is performed under solid phase or gas phase to produce a polymer. Known reactors such as a vertical reactor, horizontal reactor and the like can be used. Reactors may or may not have a stirrer. Further, a plurality of reactors may also be used. The production method may be continuous or batch-wise. The polymerization pressure is preferably from atmospheric pressure to 40 kg/m$^2$, and the polymerization temperature is preferably from 55 to 95° C.

The catalyst used in the present invention is a solid catalyst for olefin polymerization which can copolymerize ethylene with an α-olefin. As the catalyst, there are listed, for example, catalyst systems described in Japanese Patent Application Nos. 10-59846, 10-59848, 11-65433 and the like.

The solid catalyst component (I) for olefin polymerization used in the present invention is a solid catalyst component for olefin polymerization obtained by contacting a halide of a XIII or XIV group element and an electron donor with a solid catalyst component precursor containing a magnesium atom, titanium atom and a hydrocarbyloxy group.

The halogen contained in the solid catalyst component (I) is a halogen atom in the XVII group of the periodic table, for example, chlorine atom, bromine atom, iodine atom or the like, and preferably chlorine atom.

The electron donor contained in the solid catalyst component (I) is an organic compound containing at least one atom selected from the group consisting of an oxygen atom, sulfur atom, nitrogen atom and phosphorus atom, and for example, amines, sulfoxides, ethers, esters or the like are listed, and ethers and esters are preferable.

As the ethers, dialkyl ethers are listed, and specifically, diethyl ether, dibutyl ether, tetrahydrofuran and the like are listed. Dibutyl ether and tetrahydrofuran are preferable.

Examples of the esters include saturated aliphatic carboxylates, unsaturated aliphatic carboxylates, alicyclic carboxylates, aromatic carboxylates and the like. Specifically, there are listed ethyl acetate, ethyl acrylate, ethyl methacrylate, butyl benzoate, dibutyl succinate, dibutyl malonate, dibutyl maleate, dibutyl itaconate, di-n-butyl phthalate, diisobutyl phthalate, di-2-ethylhexyl phthalate, di-n-octyl phthalate and the like, and di-2-ethylhexyl phthalate and di-n-octyl phthalate are preferable.

The solid catalyst component (I) can be obtained by cotacting a halide of a XIV group element and an electron donor with a solid catalyst component precursor containing magnesium, titanium and a hydrocarbyloxy group, and further contacting with a compound having a Ti-halogen bond.

As the solid catalyst component precursor containing magnesium, titanium and a hydrocarbyloxy group, a solid product containing a tri-valent titanium atom is preferable which is obtained by reducing a titanium compound represented by the general formula $Ti(OR^1)_a X_{4-a}$ (wherein, $R^1$ represents a hydrocarbon group having 1 to 20 carbon atoms, X represents a halogen atom, and a represents a number satisfying $0<a\leq 4$) with organo-magnesium, in the presence of an organo-silicon compound having a Si—O bond.

As the organo-silicon compound having a Si—O bond, tetramethoxy silane, tetraethoxy silane, tetrapropoxy silane, tetrabutoxy silane and the like are listed, and tetrabutoxy silane is preferable.

As the hydrocarbon group ($R^1$) of the titanium compound represented by the general formula $Ti(OR^1)_a X_{4-a}$ (wherein, $R^1$ represents a hydrocarbon group having 1 to 20 carbon atoms, X represents a halogen atom, and a represents a number satisfying $0<a\leq 4$), there are listed, for example, a methyl group, ethyl group, propyl group, butyl group and the like, and a butyl group is preferable.

As the halogen atom (X) of the titanium compound represented by the general formula $Ti(OR^1)_a X_{4-a}$, there are listed a chlorine atom, bromine atom, iodine atom and the like, and a chlorine atom is preferable. a is 1, 2, 3 or 4, and is preferably 4.

Examples of the titanium compound represented by the general formula $Ti(OR^1)_a X_{4-a}$ include butoxytrichlorotitanium, dibutoxydichlorotitanium, tributoxychlorotitanium, tetrabutoxytitanium and the like, and tetrabutoxytitanium is preferable.

As the organo-magnesium, Grignard's compounds having a Mg-carbon bond, and the like are listed. Examples thereof include methylchloromagnesium, ethylchloromagnesium, propylchloromagnesium, butylchloromagnesium and the like, and butylchloromagnesium is preferable.

As the halogen compound in XIV group to be contacted with a solid catalyst precursor, halides of a carbon atom and silicon atom are listed, and halides of a silicon atom represented by the general formula $SiR^2_{4-b} X_b$ (wherein, $R^2$ represents a hydrocarbon group having 1 to 20 carbon atoms, X represents a halogen atom, and b represents a number satisfying $0<b\leq 4$) are preferable.

As the hydrocarbon group ($R^2$) of the silicon compound represented by the general formula $SiR^2_{4-b} X_b$ (wherein, $R^2$ represents a hydrocarbon group having 1 to 20 carbon atoms, X represents a halogen atom, and b represents a number satisfying $0<b\leq 4$), there are listed, for example, a methyl group, ethyl group, propyl group, butyl group and the like, and a butyl group is preferable.

As the halogen atom (X) of the silicon compound represented by the general formula $SiR^2_{4-b} X_b$, there are listed a chlorine atom, bromine atom, iodine atom and the like, and a chlorine atom is preferable. b is 1, 2, 3 or 4, and is preferably 3 or 4.

Examples of the silicon compound represented by the general formula $SiR^2_{4-b} X_b$ include butyltrichlorosilane, dibutyldichlorosilane, trichlorobutylsilane, tetrachlorosilane and the like, and tetrachlorosilane is preferable.

As the electron donor to be contacted with a solid catalyst precursor, those described above are listed.

As the halogen of a compound having a Ti-halogen bond to be further contacted with a product obtained by contacting a halogen compound of a XIV group element and an electron donor with a solid catalyst component precursor, a chlorine atom, bromine atom, iodine atom and the like are listed, and a chlorine atom is preferable.

Examples of the compound having a Ti-halogen atom include tetrahclorotitanium, trichlorobutoxytitanium, dichlorodibutoxytitanium, chlorotributoxytitanium and the like, and tetrachlorotitanium is preferable.

The ethylene-α-olefin copolymer of the present invention is an ethylene-α-olefin copolymer produced on a solid catalyst component (I) obtained by contacting the solid catalyst component (I), organo-aluminum (II) and ethylene and α-olefin.

In a gas phase polymerization method containing substantially no solvent, a process of recovering and purifying a solvent can be omitted, and the content of a volatile component causing gas generation and fuming in processing a film using the resulted ethylene-α-olefin copolymer can be decreased.

The ethylene-α-olefin copolymer (component (A)) of the present invention is a copolymer of ethylene with one or more α-olefins having 3 to 12 carbon atoms.

Examples of the α-olefin include propylene, butene-1, pentene-1,4-methyl-1-pentene, hexene-1, octene-1, decene-1 and the like. and propylene, butene-1, hexene-1 and octene-1 are preferable, and butene-1 and hexene-1 are further preferable.

Examples of the ethylene-α-olefin copolymer (component (A)) are an ethylene-propylene copolymer, ethylene-butene-1 copolymer, ethylene-4-methyl-1-pentene copolymer, ethylene-hexene-1 copolymer, ethylene-octene-1 copolymer and the like, and an ethylene-propylene copolymer, ethylene-butene-1 copolymer, ethylenehexene-1 copolymer and ethylene-octene-1 copolymer are preferable, and an ethylene-butene-1 copolymer and ethylene-hexene-1 copolymer are further preferable.

The content of the α-olefin in the ethylene-α-olefin copolymer (component (A)) is preferably from 0.5 to 30 mol %, particularly preferably from 1.0 to 20 mol %.

The melt flow rate (MFR) of the ethylene-α-olefin copolymer (component (A)) is from 0.3 to 5.0 g/10 minutes, preferably from 0.5 to 3.0 g/10 minutes, particularly preferably from 0.7 to 2.5 g/10 minutes.

When the melt flow rate (MFR) is less than 0.3 g/10 minutes, problems easily occur such as excess extrusion load in film-forming, leading to occurrence of melt fracture, and the like. When the melt flow rate (MFR) is over 5.0 g/10 minutes, the mechanical property of a film deteriorates, and film-forming stability becomes insufficient.

The melt flow rate ratio (MFRR) of the ethylene-α-olefin copolymer (component (A)) is 20 or more, preferably 21 or more.

When the melt flow rate ratio (MFRR) is less than 20, problems easily occur such as excess extrusion load in film-forming, leading to occurrence of melt fracture, and the like.

The density of the ethylene-α-olefin copolymer (component (A)) is from 0.910 to 0.930 g/cm$^3$, preferably from 0.915 to 0.930 g/cm$^3$, particularly preferably from 0.918 to 0.927 g/cm$^3$.

When the density is less than 0.910 g/cm$^3$, deterioration in anti-blocking property, lack in rigidity and the like occur, decreasing the handling property of a film. When the density is over 0.930 g/cm$^3$, the gloss and transparency of a film become insufficient.

The cold xylene-soluble portion (CXS)(wt %) in the ethylene-α-olefin copolymer component (A) is in the range defined by the formula (1):

$$1.5 \times 10^{-4} \times d^{-125} \times MFR^{0.5} + 0.32 \geq CXS \quad \text{formula (1)}$$

preferably, defined by the formula (2):

$$1.5 \times 10^{-4} \times d^{-125} \times MFR^{0.5} \geq CXS \quad \text{formula (2).}$$

When the content of the cold xylene-soluble portion (CXS) is over the upper limit of the above-described formula (1), the anti-blocking property and slipping property of a film become insufficient. The lower limit is 0 or more.

The HL110 of the ethylene-α-olefin copolymer is preferably in the range defined in the formula (3):

$$-68858 \times d^2 + 124830 \times d - 56505 \geq HL110 \quad \text{formula (3).}$$

Wherein, d is 0.910 to 0.930 g/cm$^3$, preferably from 0.915 to 0.930 g/cm$^3$, particularly preferably from 0.918 to 0.927 g/cm$^3$.

If HL110 is over the range defined by the formula (3), when the copolymer is applied for a film, the toughness, rigidity and anti-blocking property of the film may become poor.

The ratio of the fusion calorie at 110° C. or lower to the total fusion calorie measured by a differential scanning calorimeter (DSC) indicates the rigidity of an ethylene-α-olefin copolymer.

Lower this value is, higher the rigidity of an ethylene-α-olefin copolymer becomes.

The composition distribution variation coefficient Cx of an ethylene-α-olefin copolymer is preferably 0.85 or less, further preferably 0.83 or less.

If the composition distribution variation coefficient Cx is over 0.85, when the composition is applied for a film, the strength of the film may decrease, and the anti-blocking property and transparency of the film may become poor.

The composition distribution variation coefficient Cx is a scale of the composition distribution of an ethylene-α-olefin copolymer, and calculated according to the following formula.

$$Cx = \sigma / SCB_{ave}$$

σ: Standard deviation
$SCB_{ave}$: Average of number of short chain branches per 1000 carbon atoms Lower this value is, narrower the composition distribution is.

The low density polyethylene component (B) of the present invention may be a low density polyethylene obtained by a high pressure radical polymerization method, and preferably a low density polyethylene obtained by homo-polymerizing ethylene according to a high pressure radical polymerization method.

The high pressure radical polymerization method of the present invention is a method in which polymerization is initiated using a radical generating agent under high pressure and obtained a polymer. In general, ethylene and the like are polymerized to obtain a polymer under a polymerization pressure of 1400 to 3000 kg/m2 and a polymerization temperature of 200 to 300° C. in the presence of a radical generating agent such as a peroxide and the like using a vessel type reactor or tubular type reactor. A polymer obtained using a tubular type reactor contains a lower amount of microgel, and when the polymer is applied for a film, appearance failures such as fish eye and the like do not occur easily, therefore, it is preferable to use a tubular type reactor from the standpoint of the object of the present invention. The melt flow rate can be controlled by using hydrogen or hydrocarbon such as methane, ethane or the like which is a molecular weight controlling agent. The swell ratio (SR) and density can be controlled by optionally selecting the polymerization pressure and polymerization temperature in the above-described ranges.

The melt flow rate (MFR) of the low density polyethylene component (B) is preferably from 0.1 to 10 g/10 minutes, more preferably from 0.3 to 8.0 g/10 minutes, and particularly preferably from 0.8 to 6.0 g/10 minutes.

The swell ratio (SR) of the low density polyethylene component (B) is preferably from 1.40 to 1.60, more preferably from 1.45 to 1.58, particularly preferably satisfies the relation of the following formula (4) in the above-mentioned range, and most preferably satisfies the relation of the following formula (5) in the above-mentioned range.

$$-0.09(\log MFR)^2 + 0.23 \log MFR + 0.04 \times 20/B_{wt} + 1.35 < SR < -0.09(\log MFR)^2 + 0.23 \log MFR + 0.04 \times 20/B_{wt} + 1.50 \quad \text{Formula (4)}$$

$$-0.09(\log MFR)^2 + 0.23 \log MFR + 0.04 \times 20/B_{wt} + 1.40 < SR < -0.09(\log MFR)^2 + 0.23 \log MFR + 0.04 \times 20/B_{wt} + 1.48 \quad \text{Formula (5)}$$

The density of the low density polyethylene component (B) is preferably from 0.900 to 0.935 g/cm$^3$, and particularly preferably 0.915 to 0.930 g/cm$^3$.

The melt tension (MT) of the polyethylene composition of the present invention is preferably from 1.8 to 5.5 g, more preferably from 2.0 to 5.0 g.

Regarding the compounding amounts (compounding ratios) of an ethylene-α-olefin copolymer (component (A)) obtained by a gas phase polymerization method and a low density polyethylene (component (B)) obtained by a high pressure radical polymerization method, the amount of the component (A) is from 60 to 95 wt % and the amount of the component (B) is from 40 to 5 wt %, and preferably, the amount of the component (A) is from 70 to 93 wt % and the amount of the component (B) is from 30 to 7 wt %. Wherein, the total amount of the component (A) and the component (B) is 100 wt %.

The anti-blocking agent component (C) in the present invention can prevent mutual adhesion and fusion of a resin, and can prevent the resin from forming a larger block, and is used together with a resin. Particularly, the anti-blocking agent component (C) can prevent the mutual adhesion and fusion of a resin in the form of a sheet or film, and can prevent the resin from forming a larger block.

The anti-blocking agent component (C) in the present invention is not particularly restricted, and there are exemplified inorganic anti-blocking agents and organic anti-blocking agents.

As the inorganic anti-blocking agent, synthetic anti-blocking agents and natural anti-blocking agents are listed. As the inorganic synthetic anti-blocking agent, there are listed, for example, synthetic silica, and a powder of crystalline or amorphous alumino-silicate, and the like, and a powder of crystalline or amorphous alumino-silicate is preferable. As the inorganic natural anti-blocking agent, there are listed, for example, those obtained by grinding and calcinating silicon dioxide, clay, talk, diatomaceous earth, feldspar, kaolin, zeolite, kaolinite, wollastonite, sericite and the like. Further, the surfaces of these materials may be treated with a surface treating agent such as a higher fatty acid such as stearic acid and the like, titanium coupling agent, silane coupling agent and the like.

As the organic anti-blocking agent, synthetic anti-blocking agents are listed, and examples thereof include powders of cross-linked acrylic resins, cross-linked polyethylene-based resin, cross-linked polystyrene-based resin, cross-linked silicone-based resin, polyamide-based resin, polyester-based resin and the like. A powder of a cross-linked methylpolymethacrylate is preferable. Also in the case of the organic anti-blocking agents, the surfaces thereof may be treated with a surface treating agent such as a higher fatty acid such as stearic acid and the like, titanium coupling agent, silane coupling agent and the like, as in the case of the inorganic anti-blocking agents.

As the anti-blocking agent (C), two or more of the above-described anti-blocking agents may also be used together.

The compounding amount (compounding ratio) of the anti-blocking agent component (C) in the polyethylene composition of the present invention is preferably from 0.05 to 0.60 wt %, more preferably from 0.05 to 0.40 wt %. When the compounding amount of the anti-blocking agent (C) is less than 0.05 wt %, the anti-blocking property of a film may be insufficient. While when the compounding amount of the anti-blocking agent (C) is over 0.60 wt %, the optical property of a film may deteriorate.

The anti-blocking agent component (C) preferably has an average particle size of 1 to 10 µm and a circular degree coefficient of 0.600 or more, more preferably has an average particle size of 3 to 6 µm and a circular degree coefficient of 0.630 or more, from the standpoints of the appearance and anti-blocking property of a film. Further, two or more components having different average particle sizes and different circular degree coefficients may be used together.

Regarding the circular degree coefficient of the present invention, an image observed by an optical microscope is photographed, the image is treated by an image analyzer, and the circular degree coefficient S is calculated according to the following formula.

$$S=4\pi \times A/L^2$$

(A: area of image, L: circumference length)

This circular degree coefficient approximates 1 when the image is near circle. In the case of the above-mentioned anti-blocking agent component (C), the circular degree coefficient S is preferably from 0.600 to 1.000. More preferably, it is from 0.630 to 1.000, further preferably, it is from 0.700 to 1.000.

The slipping agent (D) of the present invention is used together with a resin so that the resins mutually slip easily when they come into contact with each other, and particularly, is used together with a resin so that the resins in the form of a sheet or film slip easily each other and can be handled easily.

The slipping agent (D) is not particularly restricted, and there are listed known fatty amide compounds, specifically, saturated fatty amides, unsaturated fatty amides, saturated fatty bisamides, unsaturated fatty bisamides and the like.

Examples of the saturated fatty amide are palmitic amide, stearic amide, behenic amide and the like, and behenic amide is preferable. Examples of the unsaturated fatty amide are oleic amide, erucic amide and the like, and erucic amide is preferable. Examples of the saturated fatty bisamide are ethylene-bis-palmitic amide, ethylene-bis-stearic amide, hexamethylene-bis-stearic amide and the like, and ethylene-bis-stearic amide is preferable. Examples of the unsaturated fatty bisamide are ethylene-bis-oleic amide, hexamethylene-bis-oleic amide, N,N'-dioleylsebacic amide and the like, and ethylene-bis-oleic amide is preferable.

Two or more of the above-described slipping agents (D) may be used together. When two or more of the slipping agents (D) are used, a mixed system of an unsaturated fatty amide with a saturated or unsaturated fatty bisamide is preferable.

The compounding amount (compounding ratio) of the slipping agent (D) in the polyethylene composition of the present invention is preferably from 0.05 to 0.35 wt %, more preferably from 0.05 to 0.30 wt %. When the compounding amount of the slipping agent (D) is less than 0.05 wt %, the anti-blocking property and slipping property of a film may be insufficient. While when the compounding amount of the slipping agent (D) is over 0.35 wt %, the optical property and the like of a film may deteriorate due to excess bleeding of the slipping agent.

The method for producing the polyethylene composition of the present invention is not particularly restricted, and any known method can be used, and the composition is obtained by uniformly melting and kneading components used in the present invention. For example, there are listed a method in which components are mixed by a tumbler blender, henschel mixer and the like, then, the mixture is further melted and kneaded by a single-screw extruder or multi-screw extruder to give a granule, a method in which components are melted and kneaded by a kneader, banbury mixer and the like, then, the mixture is granulated using an extruder, as well as other methods.

It is also possible that an anti-blocking agent component (C) and/or slipping agent component (D) is melted and mixed in high concentration with an ethylene-α-olefin copolymer component (A) and/or low density polyethylene component (B) to give a master pellet, then, this master pellet is compounded in necessary amount with the ethylene-α-olefin copolymer component (A) and/or low density polyethylene component (B) to obtain the polyethylene composition of the present invention.

In the polyethylene composition of the present invention, at least one or more of various resins may be compounded, if necessary, to an extent not deteriorating the object of the present invention. For example, a high density polyethylene can be used for improving rigidity, and further, a polyolefin-based resin such as a low density elastomer and the like can be used for improving impact strength.

In the polyethylene composition of the present invention, known additives such as a stabilizer, antistatic agent, processability improving agent and the like usually used may also be contained, if necessary, to an extent not deteriorating the object of the present invention.

As the stabilizer, a phenol-based stabilizer, phosphite-based stabilizer and the like are listed. Examples of the phenol-based stabilizer include 2,6-di-t-butyl-p-cresol (BHT), tetrakis[methylene-3-(3,5-di-t-butyl-4-hydroxyphenyl)propionate]methane (IRGANOX 1010), n-octadecyl-3-(4'-hydroxy-3,5'-di-t-butylphenyl)propionate (IRGANOX 1076) and the like. Examples of the phosphite-based stabilizer include bis(2,4-di-t-butylphenyl) pentaerythritol diphosphite, tris(2,4-di-t-butylphenyl) phosphite, tetrakis(2,4-di-t-butylphenyl)4,4'biphenylene diphosphonite and the like.

Examples of the antistatic agent include fatty acid glycerin ester having 8 to 22 carbon atoms, sorbitan ester, polyethylene glycol ester and the like. As the processability improving agent, there are listed fatty acid metal salts, for example, calcium stearate and the like.

A film made of the polyethylene composition of the present invention can be obtained by an tubular process such as an air-cooling tubular process, water-cooling tubular process and the like. The thickness of a film is usually from 5 to 200 $\mu$m. A film having a thickness of 50 to 200 $\mu$m is more preferable in balance between appearances such as gloss, transparency and the like and handling properties such as anti-blocking property, slipping property and the like.

Regarding the processing of a film, the polyethylene composition of the present invention may be singly subjected to processing alone to give a film, or the polyethylene composition of the present invention may be laminated with other thermoplastic resin composition and processed to obtain a film. In the case of lamination and processing of a film, it is preferable that lamination and processing is so conducted that a layer composed of the polyethylene composition of the present invention is placed on one side or both sides of the outermost layer.

As the lamination and processing method, there are listed, for example, a co-extrusion tubular process, dry lamination process, sandwich lamination process and the like.

The co-extrusion tubular process is a method in which the polyethylene composition of the present invention and other resin are co-extruded, and a co-extruded film having two or more layers can be obtained. Examples of other resin which can be used in the co-extrusion tubular process are polyethylene, polypropylene, ethylene-vinyl acetate copolymer, polyamide, polyester and the like.

The dry lamination process or sandwich lamination process is a method in which the polyethylene composition of the present invention is processed alone or co-extruded to obtain a film, and the obtained film is laminated with other film or sheet to obtain a laminated film or laminated sheet. As other film or sheet which can be used in the dry lamination process or sandwich lamination process, there are listed, for example, stretched or non-stretched film or sheet composed of polypropylene, polyester, polyamide and the like, aluminum foil, cellophane, paper, and further, composite film, sheet and the like thereof.

As described above according to the present invention, there can be provided an ethylene-α-olefin copolymer in which the content of a volatile component is small and the amount of a cold xylene-soluble portion (CXS) is small. Due to a small amount of a cold xylene-soluble portion (CXS), there can be provided a good film having particularly excellent anti-blocking property and the like.

Further, the present invention can provide a polyethylene composition which produces little fuming in processing a film, gives a film having excellent appearances such as gloss, transparency and the like, excellent handling properties such as slipping property and the like and high strength, and reveals excellent balance thereof.

Moreover, a film obtained from the copolymer or composition of the present invention can be optimally used as a wrapping material for food, fiber, medicines, fertilizer, general merchandise, industrial products and the like or as an agricultural coating agent and constructive coating agent, utilizing the excellent properties thereof.

EXAMPLE

The following examples illustrated the present invention in detail below, but do not limit the scope of the present invention.

Preparation of specimen (samples for measuring melt flow rate (MFR), melt flow rate ratio (MFRR), swell ratio (SR) and density).

Specimens for measuring melt flow rate (MFR), melt flow rate ratio (MFRR), swell ratio (SR) and density were prepared according to the following methods.

Component (A) and component (B): Specimens were prepared by melt-extruding the components previously heating at 170 to 250° C. using an extruder.

Composition: The component (A), component (B), anti-blocking agent (C) and slipping agent (D) were compounded, and the compound was melt-extruded previously at 170 to 250° C. using an extruder, to give a specimen.

Evaluations were conducted according to the following methods.

(1) Evaluation of Fuming

A T die was installed to a $\phi$ 30 mm extruder manufactured by Union K.K., and the temperature of each heater was controlled at 290° C. Each resin was extruded from this extruder at a screw rotation of 100 rpm, fume generated per 1 minute was collected, and the fuming amount was measured by using a digital dust meter, MODEL3411 manufactured by Nippon Kanomax Co., Ltd. This operation was repeated five times and the measured values were averaged to give a fuming amount, and represented by CMP unit (1CMP=0.01mg/m$^3$, in terms of $\phi$ 0.3 $\mu$m stearic acid particle). When this value is smaller, the fuming amount is smaller.

(2) Circular Degree Coefficient

The method for calculating the circular degree coefficient will be described below.

Particles were observed by an optical microscope at a magnification of 800, and an image containing 20 or more particles was photographed, and the image was treated by an image analyzer (Image Analyzer V10, manufactured by Toyobo Co., Ltd.), and the circular degree coefficient S was calculated according to the following formula.

$$S=4\pi \times A/L^2$$

(A: area of image, L: circumference length)

(3) Melt Flow Rate (MFR)

The melt flow rate was measured at a load of 2.16 kg and a temperature of 190° C. according to a method prescribed in JIS K 6760.

(4) Melt Flow Rate Ratio (MFRR)

MFR was measured under a load of 2.16 kg and at a temperature of 190° C. according to JIS K 6760, and the MFR value was divided by MFR measured under a load of 21.6 kg and at a temperature of 190° C., to give a melt flow rate ratio (MFRR).

(5) Swell Ratio (SR)

The diameter D of a strand extruded in measuring melt flow rate under a load of 2.16 kg using a melt flow rate measuring apparatus according to JIS K 7210 was measured, and ratio $D/D_0$ was calculated to give swell ratio (SR), wherein $D_0$ is a diameter of an orifice. The measuring temperature was 190° C.

(6) Density (d)

It was measured according to JIS K 6760.

(7) Cold xylene-soluble Portion (CXS)

It was measured according to §175.1520 of Code of federal regulations, Food and Drugs Administration, U.S.

(8) Melt Tension (MT)

It was measured using a melt tension tester manufactured by Toyobo Co., Ltd. via an orifice having an internal diameter of 2.1 mm and L/D of 4 under the condition of a descending speed of a piston of 5.5 mm/min. The measuring temperature was 190° C.

(9) Haze (Hazing Degree)

It was measured according to ASTM D1003. When this value is smaller, transparency is more excellent.

(10) LSI (transparent feeling)

A processed film was conditioned at a temperature of 23±2° C. and a relative humidity of 50±5% for 24 hours or more, then, scattered transmitted light at ±0.4° to 1.2° was measured by a LSI tester manufactured by Toyo Seiki seisaku-sho,Ltd., and the resulted value was used as a measure for transparent feeling. When this value is smaller, transparent feeling is more excellent.

(11) Gloss

It was measured according to JIS Z 8741. When this value is larger, gloss is more excellent.

(12) Shearing Blocking

Processed films were conditioned at a temperature of 23±2° C. and a relative humidity of 50±5% for 24 hours or more, then, two of the processed films were laminated, and allowed to adhere closely under a load of 400 g/cm² in an oven controlled at 40° C., then, the maximum stress was measured necessary for pealing 50 cm² of the film adhered surface in shearing fashion under the condition of a tensile speed of 200 mm/min. by a tensile tester of constant cross head speed type, and the measured value was used as a scale for anti-blocking property. When this value is smaller, the anti-blocking property is more excellent.

(13) Dynamic Friction Coefficient

A sample film of 250 mm (length)×100 mm (width) was attached to a slipping plate and a sample film of 100 mm (length)×70 mm (width) was attached to the lower surface of a thread having a weight of 200 g, respectively, using a friction coefficient measuring apparatus manufactured by Tester Sangyo Co., Ltd. The thread was placed on the slipping plate, and a sash weight of 300 g was placed thereon. The slipping plate was moved 70 mm under the condition of a slipping speed of 700 mm/min. and the friction force was measured.

$$\text{Dynamic friction coefficient } \mu k = Fk/P$$

Fk: Dynamic friction force, P: weight of thread+weight of sash weight (g)

When this value is smaller, the slipping property is more excellent.

(14) Ratio of Fusion Calorie at 110° C. w or Lower to the Total Fusion Calorie Measured by Differential Scanning Type Calorimeter (DSC) (HL110)

The ratio (HL110) of a fusion calorie at 110° C. or lower to the total fusion calorie measured by a differential scanning type calorimeter (DSC) is obtained as follows: A differential scanning type calorimeter, type DSC-7 apparatus manufactured by Perkin Elmer Co., Ltd. was used, about 5 mg of a sample was filled in an aluminum pan, heated up to 150° C. at a rate of 100° C./min., kept at 150° C. for 5 minutes, then, cooled down to 40° C. at a rate of 5r/min., kept at 40° C. for 5 minutes, then, heated up to 150° C. at a rate of 5° C./min., providing a fusion curve, and a point where the fusion curve returns to the base line of higher temperature side and a point at 40° C. of the fusion curve were connected by a straight line, and the fusion calorie was calculated from the total area of parts surrounded by this straight line and the fusion curve, the total area was divided at 110° C. into two portions, and a the ratio of the area of a portion of 110° C. or lower to the total area was defined as a fusion calorie ratio of 110° C. or lower (HL110).

(15) Composition Distribution Variation Coefficient Cx

The composition distribution variation coefficient Cx was measured by using a multi-functional LC manufactured by Tosoh Corp. An ethylene-α-olefin copolymer used in the present invention was dissolved into an ortho-dichlorobenzene (ODCB) solvent heated at a temperature of 145° C. (concentration: 0.2 g/20 ml), charged into a column filled with sea sand in a column oven, the temperature of the oven was decreased to 125° C. at a rate of 40° C./60 minutes, and decreased from 125° C. to −15° C. over a period of 14 hours. Subsequently, the solution was heated at a rate of 10° C./60 minutes up to 125° C., and the relative concentration of a copolymer flowed out during this period and branching degree thereof were measured by FT-IR connected to the column. Data at 7 points at the constant interval during 10° C. were measured. The relative concentration and the short chain branching degree per 1000 carbon atoms (SCB) in the main chain of a copolymer flowed out at each temperature set were measured, while heating up to the final temperature. Wherein, the relation of each elution temperature and branching degree followed the formula (6) irrespective of the kind of a comonomer. Elution was not conducted at a temperature where SCB manifests minus value.

$$SCB = -0.7322 \times \text{elution temperature (° C.)} + 70.68 \qquad \text{Formula (6)}$$

The composition distribution curve was obtained from the resulted relative concentration and branching degree, and from this curve, the average short chain branching degree per 1000 carbon atoms and the standard deviation (σ) of the composition distribution were obtained, and the composition distribution variation coefficient Cx which represents the breadth of distribution was obtained.

$$\text{Average short chain branching degree (SCBave)} = \Sigma N(i) \cdot W(i) \qquad \text{Formula (7)}$$

N(i): Short chain branching degree of i-th data sampling point

W(i): Relative concentration of i-th data sampling point Namely, $\Sigma W(i) = 1$ $$\text{Standard deviation (σ) of composition distribution} = \{\Sigma(N(i) - SCBave)^2 \cdot W(i)\}^{0.5} \qquad \text{Formula (8)}$$

(16) Dirt Impact

It was obtained according to ASTM D 1709.

(17) Blocking

Processed films were conditioned at a temperature of 23±2° C. and a relative humidity of 50±5% for 24 hours or more, then, two of the processed films were laminated, and allowed to adhere closely under a load of 800 g/cm² in an oven controlled at 40° C., then, a blocking measuring apparatus of Mackenzie's mode single fiber tensile tester-remodeled type manufactured by Shimadzu Corp. was used and specimens of 10 cm×22 cm were fixed to upper and lower clamps respectively and a driving motor was allowed to revolve to move the clamps under the conditions of a pealing load speed of 20 g/min. and a pealing area of 50 cm$^2$ and the load when the two films were pealed completely was recorded. This load was represented in terms of g/50 cm$^2$ and used as a scale for blocking. When this value is smaller, the anti-blocking property is more excellent.

Example 1

(1) Synthesis of Solid Catalyst Component (I)

A SUS reaction vessel having a content volume of 200 L equipped with a stirrer was purged with nitrogen, then, 80 L of hexane, 20.6 kg of tetraethoxysilane and 2.2 kg of tetrabutoxytitanium were charged, and the mixture was controlled to 5° C. Then, to this was added dropwise 50 L of butyl magnesium chloride (2.1 mol/L dibutyl ether solvent) over 4 hours while maintaining at 5° C. After completion of the addition, the mixture was further stirred for 1 hour at 20° C., then, filtrated, and washed with 70 L of toluene three times, then, to this was added 63 L of toluene, 14.4 kg of phenyl trichlorosilane and 9.5 kg of diisobutyl phthalate and they were reacted for 2 hours at 105° C. Then, the mixture was filtrated, and washed with 90 L of toluene three times, then, to this was added 63 L of toluene, and the mixture was heated to 70° C., 13.0 kg of TiCl$_4$ was charged, and they were reacted for 2 hours at 105° C. Then, the mixture was separated into solid and liquid, and washed six times with 90 L of toluene at 90° C. and washed twice with 90 L of hexane at room temperature, and dried to obtain 15.2 kg of a solid catalyst component (I) having excellent powdery nature and condition. The resulted solid catalyst component (I) contained 1.17 wt % of Ti.

(2) Previous Polymerization of Solid Catalyst Component

An autoclave having a content volume of 210 L equipped with a stirrer was purged with nitrogen, then, 1.515 kg of the solid catalyst component (I) obtained in the above-described procedure, 98.4 L of butane and 3.2337 mol of triethylaluminum were charged. Then, the temperature was set at 40° C., hydrogen was added until the total pressure reached 0.928 Mpa, and further, 28 kg of ethylene was added at a rate of 2.44 g/g solid catalyst component hr (per 1 g of solid catalyst component). After completion of the reaction, butane was flashed to obtain 28.55kg of a previously polymerized catalyst.

(3) Polymerization

Ethylene and butene-1 were random-copolymerized by using a continuous fluidized bed gas phase polymerization equipment utilizing the above-described previously polymerized catalyst. The polymerization vessel was heated to 90° C., then, 80 kg of a polyethylene powder previously dried under reduced pressure was added as a dispersing agent, then, a mixed gas in which the molar ratio of ethylene/butene-1/hydrogen was controlled to 63/27/10 was circulated under a pressure of 2 Mpa at a flow rate of 0.34 m/s. When the molar ratio of ethylene/butene-1/hydrogen was out of the set value, the molar ratio was regulated by further adding the components. Then, triethylaluminum and the above-mentioned previously polymerized catalyst were charged into the vessel at flow rates of 46.7 mmol/hr and 0.73 g/hr respectively, and fluidized bed gas phase copolymerization of ethylene/butene-1 was conducted 24 hours continuously. The particle nature and condition of the resulted polymer was excellent, and adhesion to the polymerization wall was scarcely observed. The amount produced of the polymer per catalyst (polymerization activity) was 28100 g polymer/g solid catalyst component. The physical properties of the resulted ethylene-butene-1 copolymer are shown in Table 2.

Subsequently, to the resulted ethylene-butene-1 copolymer was added 1000 ppm of calcium stearate, 1000 ppm of n-octadecyl-3-(4'-hydroxy-3,5'-di-t-butylphenyl) propionate and 800 ppm of tetrakis(2.4-di-t-butylphenyl)4.4'biphenyl diphosphonite, then, the mixture was processed by a 20 mm φ extruder manufactured by Tanabe Plastic Co., Ltd. and an tubular processing machine having a die size of 25 mm φ and a lip size of 2.0 mm, at a processing temperature of 180 to 190° C., an extrusion amount of 1.2 kg/hr and a blow ratio of 1.8, to form a film having a thickness of 20 μm, and the blocking value thereof is shown in Table 2.

Examples 2 to 7

Ethylene-butene-1 copolymers were produced in the same manner as in Example 1 except that experimental conditions are changed as shown in Table 1. The physical properties and film blocking values of Examples are shown in Table 2.

Comparative Examples 1 to 5

Ethylene-butene-1 copolymers obtained by gas phase polymerization and used for comparative examples are shown below.

Comparative Example 1: SUMIKATHENE-L CA1010 manufactured by Sumitomo Chemical Co., Ltd.

Comparative Example 2: SUMIKATHENE-L FS150A manufactured by Sumitomo Chemical Co., Ltd.

Comparative Example 3: SUMIKATHENE-L FS140A manufactured by Sumitomo Chemical Co., Ltd.

Comparative Example 4: SUMIKATHENE-L FS150C manufactured by Sumitomo Chemical Co., Ltd.

Comparative Example 5: SUMIKATHENE-L FS240A manufactured by Sumitomo Chemical Co., Ltd.

The physical properties and film blocking values of Comparative Examples 1–5 are shown In Table 2.

When Examples 1 and 2 are compared with Comparative Examples 1 and 2 having the same MFR and the same density, it is found that the amount of a cold xylene-soluble portion (CXS) is smaller, the composition distribution variation coefficient (Cx) is smaller, and the blocking value is also. smaller, in Examples 1 and 2. Namely, it is known that the anti-blocking property of an ethylene-butene-1 copolymer when made into a film is more excellent in the examples.

When Example 4 is compared with Comparative Example 3, Example 5 is compared with Comparative Example 4, and Example 7 is compared with Comparative Example 5, each having the same MFR and the same density, it is found that the amount of a cold xylene-soluble portion (CXS) is smaller, the composition distribution variation coefficient (Cx) is smaller, and the blocking value is also smaller, in the examples. Namely, it is known that the anti-blocking property of an ethylene-butene-1 copolymer when made into a film is more excellent in the examples.

From comparison of the ratio of fusion calorie at 110° C. or lower (HL110) to the total fusion calorie measured by differential scanning type calorimeter (DSC) and the calculated value according the formula (3'), it is known that Examples 1 to 7 and Comparative Examples 1 to 5 satisfy the formula (3), while, from comparison of the cold xylene-soluble portion (CXS) and the calculated value according the formula (1'), it is known that Examples 1 to 7 satisfy the formula (1) and Comparative Examples 1 to 5 do not satisfy the formula (1).

Example 7(2), Comparative Example 6

Evaluation of Volatile Component (Fuming) Amount

The volatile component (fuming) amount in the ethylene-butene-1 copolymer obtained by the gas phase polymerization method in Example 7 was compared with the volatile component (fuming) amount in an ethylene-butene-1 copolymer obtained by a high pressure ion polymerization method (SUMIKATHENE-L CL2060 manufactured by Sumitomo Chemical Co., Ltd.). In the present sample, 0.05 parts by weight of hydrotalcite which does not easily become a volatile component (fuming) was added as a neutralizing agent, and evaluation was conducted. The physical properties and fuming evaluation results are shown in Table 3.

The ethylene-butane-1 copolymer obtained by the gas phase polymerization method in Example 7 showed smaller volatile content (fuming) during processing and more excellent handling property in processing as compared with the ethylene-butane-i copolymer obtained by the high pressure ion polymerization method in Comparative Example 6.

From comparison of the ratio of fusion calorie at 110° C. or lower (HL110) to the total fusion calorie measured by differential scanning type calorimeter (DSC) and the calculated value according to the formula (3'), it is known that Example 7(2) satisfies the formula (3) and Comparative Example 6 does not satisfy the formula (3). Namely, the composition in Example 7(2) manifests, when made into a film, excellent toughness, rigidity and anti-blocking property, and the composition in Comparative Example 6 manifests, when made into a film, deficient toughness, rigidity and anti-blocking property.

TABLE 1

| | Polymerization Temperature °C. | Ethylene mol % | Butene-1 mol % | Hydrogen mol % | Total gas pressure MPa | Gas Flow Rate m/s | Triethylaluminium feed mmol/hr | Previously polymerized catalyst feed mmol/hr | Ploymerization activity g polymer/g solid catalyst component |
|---|---|---|---|---|---|---|---|---|---|
| Example 1 | 90 | 63 | 27 | 10 | 2 | 0.34 | 46.7 | 0.73 | 28100 |
| Example 2 | 89 | 60 | 30 | 10 | 2 | 0.34 | 61.5 | 1.2 | 18400 |
| Example 3 | 87 | 60 | 29 | 11 | 2 | 0.34 | 73.5 | 0.83 | 26500 |
| Example 4 | 90 | 63 | 28 | 9 | 2 | 0.34 | 46.3 | 0.76 | 26400 |
| Example 5 | 85 | 62 | 26 | 12 | 2 | 0.34 | 50.4 | 0.88 | 21400 |
| Example 6 | 87 | 60 | 29 | 11 | 2 | 0.34 | 58.4 | 0.99 | 21900 |
| Example 7 | 85 | 55 | 32 | 13 | 2 | 0.40 | 60.8 | 1.17 | 16900 |

TABLE 2

| Sample | MFR g/10 minutes | MFRR | Density (d) g/cm³ | Ratio of fusion calorie at 110° C. or lower (HL110) | Cold xylene-soluble portion (CXS: actually measured) wt % | Composition distribution variation coefficient Cx | Formula (1') *1 | Formula (3') *2 | Blocking value 20μ g/50 cm² |
|---|---|---|---|---|---|---|---|---|---|
| Example 1 | 1.0 | 21.3 | 0.921 | 51.5 | 4.3 | 0.78 | 4.7 | 55.3 | 20 |
| Example 2 | 1.0 | 21.5 | 0.921 | 51.0 | 4.5 | 0.80 | 4.7 | 55.3 | 20 |
| Example 3 | 1.0 | 21.8 | 0.922 | 48.2 | 4.0 | 0.79 | 4.1 | 53.2 | 19 |
| Example 4 | 0.90 | 21.6 | 0.919 | 52.7 | 5.0 | 0.77 | 5.8 | 59.0 | 32 |
| Example 5 | 0.87 | 22.0 | 0.923 | 48.2 | 3.1 | 0.80 | 3.2 | 51.0 | 15 |
| Example 6 | 1.0 | 21.7 | 0.922 | 50.2 | 4.0 | 0.79 | 4.1 | 53.2 | 19 |
| Example 7 | 2.2 | 21.6 | 0.919 | 56.1 | 8.7 | 0.78 | 8.9 | 59.0 | 47 |
| Comparative example 1 | 1.0 | 22.7 | 0.921 | 48.6 | 5.7 | 0.88 | 4.7 | 55.3 | 24 |
| Comparative example 2 | 1.0 | 25.0 | 0.921 | 46.8 | 8.7 | 1.04 | 4.7 | 55.3 | 67 |
| Comparative example 3 | 0.95 | 25.0 | 0.919 | 50.5 | 10.3 | 0.96 | 5.9 | 59.0 | 68 |
| Comparative example 4 | 0.71 | 25.1 | 0.923 | 41.9 | 7.2 | 0.98 | 3.1 | 51.0 | 38 |
| Comparative example 5 | 2.0 | 26.0 | 0.919 | 51.0 | 11.0 | 0.96 | 8.5 | 59.0 | 72 |

*1: Formula (1') = $1.5 \times 10^{-4} \times d^{-125} \times MFR^{0.5} + 0.3$
*2: Formula (3') = $-68858 \times d^2 + 124830 \times d - 56505$

TABLE 3

| Sample | Example 7(2) | Comparative example 6 |
|---|---|---|
| MFR (g/10 min) | 2.2 | 2.0 |
| MFRR | 21.6 | 26.6 |
| Density g/cm$^3$ | 0.919 | 0.919 |
| CXS (wt %) | 8.7 | 3.5 |
| Composition distribution variation coefficient Cx | 0.78 | 0.56 |
| HL110 | 56.1 | 69.7 |
| Formula (3') | 59.0 | 59.0 |
| Fuming evaluation (CPM) | 600 | 2600 |

The physical properties of the ethylene-α-olefin copolymer components (A) obtained by the gas phase polymerization method used in the examples 8–17 and the comparative examples 7–12 are shown in Table 4, and the physical properties of the low density polyethylene components (B) obtained by the high pressure radical polymerization method are shown in Table 5, respectively.

Examples 8 and 9, Comparative Examples 7 and 8

The component (A), component (B), anti-blocking agent (C) and slipping agent (D), and further, calcium stearate, were mixed in a tumbler mixer to obtain polyethylene compositions having compositions shown in Table 6. The anti-blocking agent (C) and slipping agent (D) were compounded in the form of 5 to 10 wt % master batches based on the component (A) and component (B), respectively. As the anti-blocking agent (C), a synthetic aluminum silicate having a circular degree coefficient of 0.725 and an average particle size of 5.0 μm was used, and as the slipping agent (D), a mixture prepared by mixing erucic amide and ethylene-bis-stearic amide at a ratio of 80/20 was used. Calcium stearate was a neutralizing agent which can be a fuming component, and added in an amount of 0.18 parts by weight based on 100 parts by weight of the total amount of the component (A) and the component (B).

Then, the polyethylene compositions were processed by a 50 mm φ extruder manufactured by Placo Co., Ltd. and an tubular processing machine having a die size of 125 mm φ and a die lip size of 2.0 mm, at a temperature of 200° C., an extrusion amount of 25 kg/hr and a blow ratio of 1.8, to form films having given thicknesses (described in the table).

The physical properties of the resulted films are shown in Table 6. Table 6 shows that the amount of a volatile component (fuming) during processing is smaller and handling in processing is more excellent in Examples 8 and 9 using ethylene-butene-1 copolymers obtained by a gas phase polymerization method than in Comparative Examples 7 and 8 using ethylene-butene-1 copolymers obtained by a high pressure ion polymerization method.

Examples 10–15, Comparative Examples 9 and 10

The component (A), component (B), anti-blocking agent (C) and slipping agent (D) were mixed in a tumbler mixer to obtain polyethylene compositions having compositions shown in Tables 7 and 8. As the anti-blocking agent (C), that prepared by mixing a synthetic aluminum silicate having a circular degree coefficient of 0.747 and an average particle size of 3.0 μm with a synthetic aluminum silicate having a circular degree coefficient of 0.725 and an average particle size of 5.0 μm so as to give an average particle size of 3.8 μm was used, and as the slipping agent (D), a mixture prepared by mixing erucic amide and ethylene-bis-stearic amide at a ratio of 80/20 was used.

Examples 16 and 17, Comparative Examples 11 and 12

The component (A), component (B), anti-blocking agent (C) and slipping agent (D) were mixed in a tumbler mixer to obtain polyethylene compositions having compositions shown in Table 7. The anti-blocking agent (C) and slipping agent (D) were compounded in the form of 5 to 10 wt % master batches based on the component (A) and component (B), respectively.

As the anti-blocking agent component (C), that prepared by mixing a synthetic aluminum silicate having a circular degree coefficient of 0.747 and an average particle size of 3.0 μm with a synthetic aluminum silicate having a circular degree coefficient of 0.725 and an average particle size of 5.0 μm so as to give an average particle size of 3.8 μm was used, and as the slipping agent (D), a mixture prepared by mixing erucic amide and ethylene-bis-stearic amide at a ratio of 80/20 was used.

Then, the polyethylene compositions were processed by a 50 mm φ extruder manufactured by Placo Co., Ltd. and an tubular processing machine having a die size of 125 mm φ and a lip size of 2.0 mm, at a temperature of 200° C., an extrusion amount of 25 kg/hr and a blow ratio of 1.8, to form films having given thicknesses (described in the table).

The physical properties of the resulted films are shown in Tables 7 to 9. The film in Example 10 shows excellent for appearance such as transparency and the like, handling properties such as anti-blocking property and the like, strength and the like, while, the film in Comparative Example 9 shows insufficient for appearance such as transparency and the like, handling properties such as anti-blocking property and the like, strength and the like since the ethylene-butene-1 copolymer obtained by a gas phase polymerization method does not satisfy the requirement of the present invention regarding the cold xylene-soluble portion (CXS). Further, the film in Example 11 shows excellent for appearance such as transparency and the like, while, the film in Comparative Example 10 shows insufficient for appearance such as transparency and the like since the ethylene-butene-1 copolymer obtained by a gas phase polymerization method does not satisfy the requirement of the present invention regarding the cold xylene-soluble portion (CXS). The film in Example 16 shows excellent for appearance such as transparency and the like, handling properties such as anti-blocking property and the like, strength and the like, while, the films in Comparative Examples 11 and 12 show insufficient for handling properties such as anti-blocking property, slipping property and the like since the film in Comparative Example 11 does not satisfy the requirement of the present invention regarding the compounding amount (compounding ratio) of the anti-blocking agent and the film in Comparative Example 12 does not satisfy the requirement of the present invention regarding the compounding amount (compounding ratio) of the slipping agent.

TABLE 4

| | MFR g/10 minutes | MFRR | Density (d) g/cm³ | Ratio of fusion calorie at 110° C. or lower (HL110) | Composition distribution variation coefficient Cx | Cold xylene-soluble portion (CXS) wt % | Formula (1') *1 | Formula (3') *2 |
|---|---|---|---|---|---|---|---|---|
| A1 | 1.0 | 21.5 | 0.921 | 51.0 | 0.80 | 4.5 | 4.7 | 55.3 |
| A2 | 1.0 | 21.8 | 0.922 | 48.2 | 0.79 | 4.0 | 4.1 | 53.2 |
| A3 | 0.90 | 21.6 | 0.919 | 52.7 | 0.77 | 5.0 | 5.8 | 59.0 |
| A4 | 1.0 | 21.7 | 0.922 | 50.2 | 0.79 | 4.0 | 4.1 | 53.2 |
| A5 | 2.2 | 21.6 | 0.919 | 56.1 | 0.78 | 8.7 | 8.9 | 59.0 |
| A6 | 0.85 | 22.7 | 0.921 | 48.6 | 0.87 | 5.0 | 4.4 | 55.3 |
| A7 | 0.8 | 26.2 | 0.925 | 53.8 | 0.55 | 1.6 | 2.6 | 46.1 |
| A8 | 2.0 | 26.6 | 0.919 | 69.7 | 0.56 | 3.5 | 8.5 | 59.0 |

A1 to A6: Ethylene-butene-1 copolymers polymerized in gas phase polymerization process using Ziegler catalyst.
A1, A2, A3, A4 and A5 are used in Example 2, 3, 4, 6 and 7, respectively.
A7 and A8: Ethylene-butene-1 copolymers polymerized in high pressure ion polymerization process using Ziegler catalyst.
A7: SUMIKATHENE-L FA102-0 manufactured by Sumitomo Chemical Co., Ltd.
A8: SUMIKATHENE-L CL2060 manufactured by Sumitomo Chemical Co., Ltd.
*1: Formula (1') = $1.5 \times 10^{-4} \times d^{-125} \times MFR^{0.5} + 0.3$
*2: Formula (3') = $-68858 \times d^2 + 124830 \times d - 56505$

TABLE 5

| | MFR g/10 min | Density (d) g/cm³ | Swell ratio (SR) |
|---|---|---|---|
| B1 | 2.0 | 0.922 | 1.50 |
| B2 | 5.0 | 0.924 | 1.55 |
| B3 | 0.4 | 0.922 | 1.45 |

TABLE 6

| | | Example 8 | Example 9 | Comparative example 7 | Comparative example 8 |
|---|---|---|---|---|---|
| (A) Component | | A4 | A4 | A7 | A7 |
| | MFR (g/10 min) | 1.0 | 1.0 | 0.8 | 0.8 |
| | MFRR | 21.7 | 21.7 | 26.2 | 26.2 |
| | Density (g/cm³) | 0.922 | 0.922 | 0.925 | 0.925 |
| | CXS (wt %) | 4.0 | 4.0 | 1.6 | 1.6 |
| | HL110 | 50.2 | 50.2 | 53.8 | 53.8 |
| | Composition distribution variation coefficient Cx | 0.79 | 0.79 | 0.55 | 0.55 |
| | Fuming evaluation (CPM) | 2600* | 2600* | 6000* | 6000* |
| (B) Component | | B2 | B1 | B2 | B1 |
| | MFR (g/10 min) | 5.0 | 2.0 | 5.0 | 2.0 |
| | SR | 1.55 | 1.50 | 1.55 | 1.50 |
| | Density (g/cm³) | 0.924 | 0.922 | 0.924 | 0.922 |
| Compounding ratio (A)/(B) Ratio by weight | | 80/20 | 80/20 | 80/20 | 80/20 |
| Composition | MFR (g/10 min) | 1.1 | 0.96 | 0.95 | 0.84 |
| | MT (g) | 2.9 | 3.8 | 3.3 | 3.9 |
| | ABA (Parts by weight) | 0.20 | 0.20 | 0.20 | 0.20 |
| | SA (Parts by weight) | 0.19 | 0.19 | 0.19 | 0.19 |
| Film thickness (μm) | | 20 | 80 | 20 | 80 |
| Film physical properties | Haze (%) | 3.2 | 9.4 | 3.3 | 8.6 |
| | LSI (%) | 7.0 | 8.9 | 7.1 | 7.8 |
| | Gloss (%) | 131 | 116 | 131 | 120 |
| | Shear blocking (g/50 cm²) | 550 | 520 | 650 | 580 |
| | Dynamic friction coefficient (μk) | 0.11 | 0.11 | 0.11 | 0.11 |

ABA: Content (parts by weight) of anti-blocking agent component (C) (value based on 100 parts by weight of the total amount of component (A) and component (B))

SA: Content (parts by weight) of slipping agent component (D) (value based on 100 parts by weight of the total amount of component (A) and component (B))

TABLE 7

| | | Example 10 | Example 11 | Comparative example 9 | Comparative example 10 |
|---|---|---|---|---|---|
| (A) Component | | A2 | A2 | A6 | A6 |
| | MFR (g/10 min) | 1.0 | 1.0 | 0.85 | 0.85 |
| | MFRR | 21.8 | 21.8 | 22.7 | 22.7 |
| | Density (g/cm³) | 0.922 | 0.922 | 0.921 | 0.921 |
| | HL110 | 48.2 | 48.2 | 48.6 | 48.6 |
| | Composition distribution variation coefficient Cx | 0.79 | 0.79 | 0.87 | 0.87 |

TABLE 7-continued

|  |  | Example 10 | Example 11 | Comparative example 9 | Comparative example 10 |
|---|---|---|---|---|---|
|  | CXS (wt %) | 4.0 | 4.0 | 5.0 | 5.0 |
| (B) Component | | B2 | B2 | B2 | B2 |
|  | MFR (g/10 min) | 5.0 | 5.0 | 5.0 | 5.0 |
|  | SR | 1.55 | 1.55 | 1.55 | 1.55 |
|  | Density (g/cm³) | 0.924 | 0.924 | 0.924 | 0.924 |
| Compounding ratio (A)/(B) Ratio by weight | | 80/20 | 80/20 | 80/20 | 80/20 |
| Composition | MFR (g/10 min) | 1.0 | 1.0 | 0.80 | 0.80 |
|  | MT (g) | 3.1 | 3.1 | 4.3 | 4.3 |
|  | ABA (Parts by weight) | 0.20 | 0.20 | 0.20 | 0.20 |
|  | SA (Parts by weight) | 0.19 | 0.19 | 0.19 | 0.19 |
| Film thickness (μm) | | 30 | 150 | 30 | 150 |
| Film physical properties | Haze (%) | 4.5 | 22.3 | 4.7 | 25.8 |
|  | LSI (%) | 3.1 | 3.8 | 3.7 | 3.6 |
|  | Gloss (%) | 126 | 88 | 123 | 87 |
|  | Shear blocking (g/50 cm²) | 590 | — | 700 | — |
|  | Dynamic friction coefficient (μk) | 0.13 | — | 0.16 | — |
|  | Dirt impact (Kg?cm/mm) | 220 | — | 210 | — |

ABA: Content (parts by weight) of anti-blocking agent component (C) (value based on 100 parts by weight of the total amount of component (A) and component (B))

SA: Content (parts by weight) of slipping agent component (D) (value based on 100 parts by weight of the total amount of component (A) and component (B))

TABLE 8

|  |  | Example 12 | Example 13 | Example 14 | Example 15 |
|---|---|---|---|---|---|
| (A) Component | MFR (g/10 min) | A1 | A1 | A3 | A3 |
|  |  | 1.0 | 1.0 | 0.90 | 0.90 |
|  | MFRR | 21.5 | 21.5 | 21.6 | 21.6 |
|  | Density (g/cm³) | 0.921 | 0.921 | 0.919 | 0.919 |
|  | HL110 | 51.0 | 51.0 | 52.7 | 52.7 |
|  | Composition distribution variation coefficient Cx | 0.80 | 0.80 | 0.77 | 0.77 |
|  | CXS (wt %) | 4.5 | 4.5 | 5.0 | 5.0 |
| (B) Component | | B1 | B1 | B3 | B3 |
|  | MFR (g/10 min) | 2.0 | 2.0 | 0.40 | 0.40 |
|  | SR | 1.50 | 1.50 | 1.45 | 1.45 |
|  | Density (g/cm³) | 0.922 | 0.922 | 0.922 | 0.922 |
| Compounding ratio (A)/(B) Ratio by weight | | 85/15 | 85/15 | 90/10 | 90/10 |
| Composition | MFR (g/10 min) | 0.90 | 0.90 | 0.80 | 0.80 |
|  | MT (g) | 3.9 | 3.9 | 4.2 | 4.2 |
|  | ABA (Parts by weight) | 0.30 | 0.30 | 0.25 | 0.25 |
|  | SA (Parts by weight) | 0.19 | 0.19 | 0.15 | 0.15 |
| Film thickness (μm) | | 30 | 150 | 20 | 80 |
| Film physical properties | Haze (%) | 4.2 | 22.8 | 4.1 | 10 |
|  | LSI (%) | 8.1 | 7.5 | 4.2 | 4.3 |
|  | Gloss (%) | 124 | 90 | 122 | 108 |
|  | Shear blocking (g/50 cm²) | 490 | — | 630 | — |
|  | Dynamic friction coefficient (μk) | 0.11 | — | 0.11 | — |
|  | Dirt impact (Kg?cm/mm) | 210 | — | 1.320 | — |

ABA: Content (parts by weight) of anti-blocking agent component (C) (value based on 100 parts by weight of the total amount of component (A) and component (B))

SA: Content (parts by weight) of slipping agent component (D) (value based on 100 parts by weight of the total amount of component (A) and component (B))

TABLE 9

|  |  | Example 16 | Example 17 | Comparative example 11 | Comparative example 12 |
|---|---|---|---|---|---|
| (A) Component | | A2 | A2 | A2 | A2 |
|  | MFR (g/10 min) | 1.0 | 1.0 | 1.0 | 1.0 |
|  | MFRR | 21.8 | 21.8 | 21.8 | 21.8 |
|  | Density (g/cm³) | 0.922 | 0.922 | 0.922 | 0.922 |
|  | HL110 | 48.2 | 48.2 | 48.2 | 48.2 |
|  | Composition distribution variation coefficient Cx | 0.79 | 0.79 | 0.79 | 0.79 |
|  | CXS (wt %) | 4.0 | 4.0 | 4.0 | 4.0 |
| (B) Component | | B1 | B1 | B1 | B1 |
|  | MFR (g/10 min) | 2.0 | 2.0 | 2.0 | 2.0 |
|  | SR | 1.50 | 1.50 | 1.50 | 1.50 |
|  | Density (g/cm³) | 0.922 | 0.922 | 0.922 | 0.922 |
| Compounding ratio (A)/(B) Ratio by weight | | 85/15 | 85/15 | 80/20 | 80/20 |
| Composition | MFR (g/10 min) | 1.0 | 1.0 | 1.1 | 1.1 |
|  | MT (g) | 3.6 | 3.6 | 4.4 | 4.4 |
|  | ABA (Parts by weight) | 0.30 | 0.30 | 0 | 0.20 |
|  | SA (Parts by weight) | 0.19 | 0.19 | 0.19 | 0 |
| Film thickness (μm) | | 30 | 150 | 30 | 30 |
| Film physical | Haze (%) | 4.1 | 17.2 | 3.2 | 4.1 |
|  | LSI (%) | 9.6 | 9.3 | 2.6 | 7.3 |

TABLE 9-continued

|  |  | Example 16 | Example 17 | Comparative example 11 | Comparative example 12 |
|---|---|---|---|---|---|
| properties | Gloss (%) | 117 | 94 | 136 | 126 |
|  | Shear blocking (g/50 cm$^2$) | 500 | — | 750 | 1800 |
|  | Dynamic friction coefficient ($\mu$k) | 0.13 | — | 0.26 | 0.73 |
|  | Dirt impact (Kg?cm/mm) | 230 | — | 230 | 230 |

ABA: Content (parts by weight) of anti-blocking agent component (C) (value based on 100 parts by weight of the total amount of component (A) and component (B))

SA: Content (parts by weight) of slipping agent component (D) (value based on 100 parts by weight of the total amount of component (A) and component (B))

What is claimed is:

1. An ethylene-α-olefin copolymer obtained by a gas phase polymerization method in the presence of a catalyst, wherein the copolymer satisfies the following conditions (A-1) to (A-4):
   (A-1) Melt flow rate (MFR): 0.3 to 5.0 g/10 minutes
   (A-2) Melt flow rate ratio (MFRR): 20 or more
   (A-3) Density (d): 0.910 to 0.930 g/cm$^3$
   (A-4) Cold xylene-soluble portion (CXS) (wt %) is in the range defined by the formula (1):

$$1.5 \times 10^{-4} \times d^{-125} \times MFR^{0.5} + 0.3 > CXS \qquad \text{formula (1)},$$

wherein the content of the α-olefin unit in the ethylene-α-olefin copolymer is 0.5 to 30 mole %.

2. The ethylene-α-olefin copolymer according to claim 1 wherein the copolymer satisfies the following conditions (A-5) and (A-6) in addition to the conditions (A-1) to (A-4):
   (A-5): The ratio (HL110) of a fusion calorie at 110° C. or lower to the total fusion calorie measured by a differential scanning type calorimeter (DSC) is in the range defined by the formula (3):

$$-68858 \times d^2 + 124830 \times d - 56505 \geq HL110 \qquad \text{formula (3)}$$

(A-6): The composition distribution variation coefficient Cx ≤ 0.85.

3. The ethylene-α-olefin of claim 1, wherein the catalyst is a solid component obtained by contacting a halide of XIII or XIV group element and an electron donor with a solid catalyst component precursor containing a magnesium atom, titanium atom and a hydrocarbyloxy group.

4. The ethylene-α-olefin of claim 3, wherein the electron donor contained in the solid catalyst component is an organic compound containing at least one atom selected from the group consisting of an oxygen atom, sulfur atom, nitrogen atom and phosphorus atom.

* * * * *